Nov. 25, 1941.  E. H. DAU  2,263,920
METHOD OF MAKING FASTENERS
Filed March 31, 1938  2 Sheets-Sheet 2

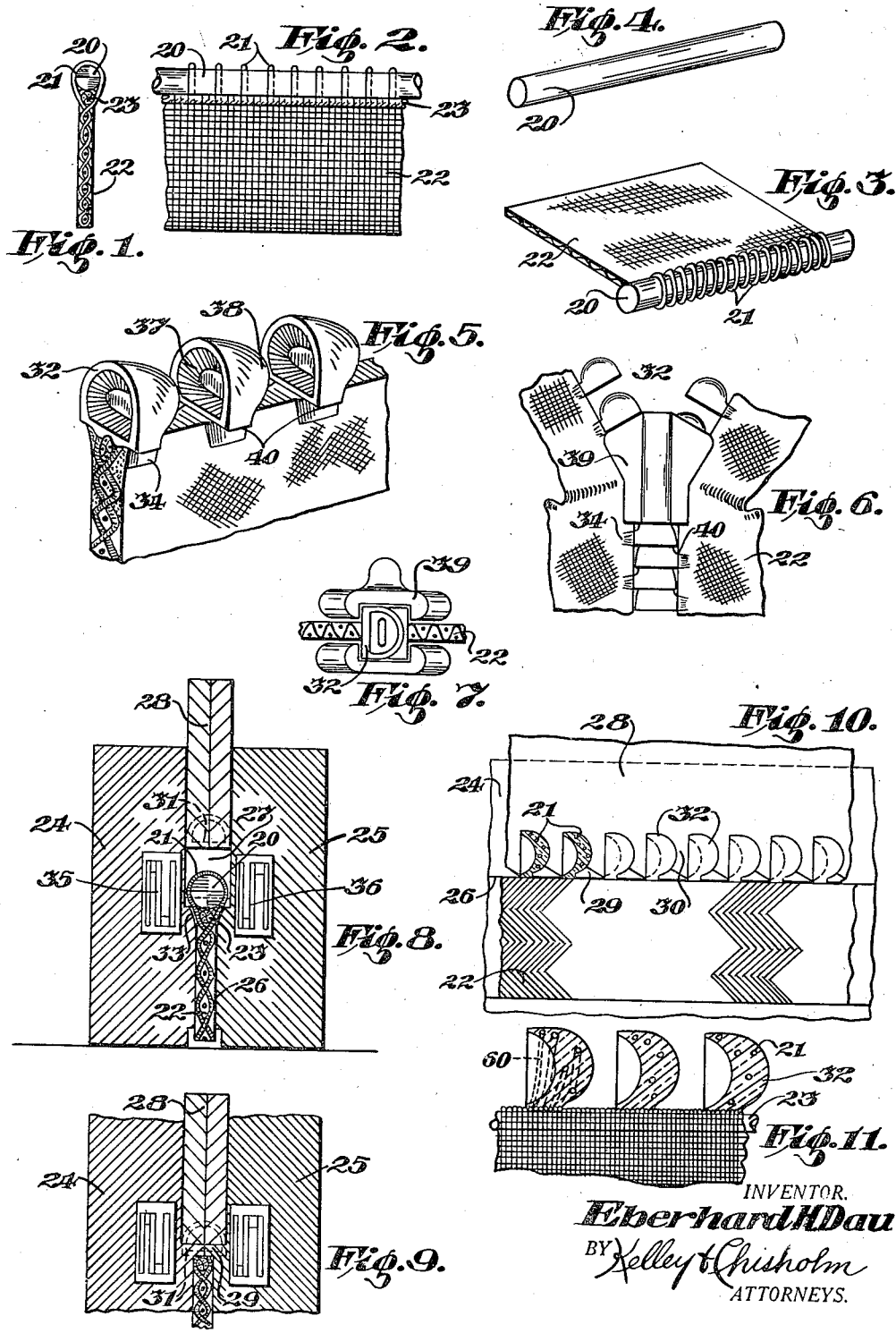

INVENTOR.
Eberhard H. Dau
BY Kelley & Chisholm
ATTORNEYS.

Patented Nov. 25, 1941

2,263,920

UNITED STATES PATENT OFFICE 2,263,920

METHOD OF MAKING FASTENERS

Eberhard H. Dau, Pittsburgh, Pa., assignor to Talon, Inc., a corporation of Pennsylvania Application March 31, 1938, Serial No. 199,174

12 Claims. (Cl. 18—59)

My invention relates to methods of making fastener stringers for slide fasteners in which there is a flexible carrier, usually a fabric tape, and a plurality of fastener elements attached thereto at spaced intervals.

More particularly my invention relates to the molding of the fastener elements directly to the stringer at properly spaced intervals.

One of the objects of my invention is to provide an improved method of molding fastener elements in contact with a flexible stringer which is adaptable to molding of polymerizable compounds such as "Bakelite" and "Beetleware."

Another object is to provide a method of molding fasteners in which the problem of supplying the moldable material to the mold will be practically eliminated.

Still another object is to provide an improved method of molding fasteners in which the individual elements will be securely anchored to the tape.

The advantages of polymerized materials in fasteners have been recognized but up to the present time, no satisfactory method of making fasteners from such materials has been devised so far as I am aware. In my invention, I propose to use such materials either in powder form or in the form of an extruded rod in an intermediate state (B state). I propose also to mold these materials in very intimate contact with the fabric of the tape. Preferably a part of the tape itself is employed to hold the moldable material temporarily in position before the molding operation. During the molding operation that part of the fabric which surrounds the moldable material is embedded into the body of the fastener elements and cannot be noticed in the finished fastener as it simply serves as a filler for the plastic material.

According to my invention, a structure is prepared in which a uniformly distributed mass of plastic material is held on the tape by textile threads. During the molding operation, this material will flow into the die cavities to form separate fastener elements secured to the stringer at spaced apart intervals and at least part of the threads which are employed to hold the material in place will flow with the material into the body of the fastener elements. In some instances it may be desirable to use thermoplastic materials and my invention is equally adaptable for use with those materials. In using thermoplastics such as cellulose acetate, it may be found advisable to employ rayon threads along the edge of the tape which is placed in the mold cavity. Such a molding operation can be performed without leaving any rigid connection between the fastener elements. At least the amount of moldable material between the fastener elements is so slight that it may be readily broken up by a flexing operation.

In the accompanying drawings I have shown for purposes of illustration certain embodiments which my invention may assume in practice. In the drawings:

Figs. 1, 2 and 3 are a cross-section, plan view and a perspective view, respectively, of a woven combination ready for the molding operation;

Fig. 4 shows the extruded rod of plastic material separated from the tape;

Fig. 5 is a perspective view on an enlarged scale of a portion of the slide fastener stringer made by my improved molding operation;

Fig. 6 shows a small portion of an assembled slide fastener;

Fig. 7 is a cross-section of an assembled slide fastener;

Figs. 8 and 9 are cross-sections through a molding die in open and closed positions respectively;

Fig. 10 is a vertical central section through the mold assembly;

Fig. 11 is a longitudinal section through the molded stringer;

I propose to weave the structure shown in Figs. 1, 2 and 3 in a loom so that the rod 20 is surrounded by loops 21 which are merely extensions from some of the cross threads of the flat body 22 of the tape. Preferably the tape has a relatively large longitudinal thread 23 at the base of the loops 21 and some of the cross threads go around this thread 23. Of course, if desired, the tape may be woven separately from the extruded rod 20 and the rod later assembled with it.

Figure 12:
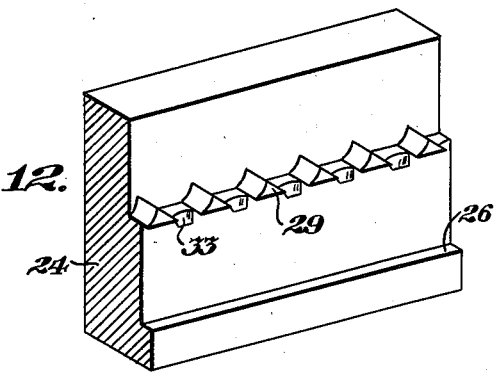
Fig. 12 is a perspective view showing the face of one of the mold parts.

It will be understood that the plastic rod 20 may be extruded from polymerizable material such as "Bakelite" and "Beetleware" in an intermediate plastic state (B state) although if desired, the rod may be formed from thermoplastic material such as cellulose acetate. The assembled tape and plastic material are next placed in a mold as shown in Fig. 8, having opposed mold parts 24, 25, with suitable impressions to leave a space 26 between them for receiving the flat part of the tape and a chamber 27 for receiving the compression member 28. The compression member is preferably made in two parts. The beaded edge of the structure including the plastic material 20 rests at the base of the chamber 27. The opposed mold parts 24 and 25 are of identical construction and their shape can be seen better in Fig. 12. Each of them carries lugs or projections 29, which when the parts are assembled together, contact one another and form abutments cooperating with the projecting elements 30 on the compression member 28, see Fig. 10, to divide the plastic material into separate masses which flow into the cavities 31 of the compression member to form the fastener elements 32. The plastic material is thus molded in contact with the stringer into the form of separate fastener elements secured to the stringer at spaced intervals. The plastic material will tend to impregnate the tape and anchor itself firmly to it. To make an even more secure anchorage the mold parts have small recesses 33 into which the moldable material may flow to form extensions 34 on the fastener elements. Heating elements 35, 36 are arranged in the mold parts on opposite sides of the mold chamber and if desired, a heating element may also be placed in the compression member 28.

The finished fastener will have the appearance shown in Figs. 5, 6 and 7. The fastener elements each have a pocket 37 and a correspondingly shaped projection 38 on its opposite side leaving shoulders to interlock with corresponding elements on the opposite side in substantially the same way as the fastener elements shown in the Sundback Patent 1,219,881, March 20, 1917. The fastener elements in the assembled fastener will have a relatively narrower appearance than in the conventional fastener due to the fact that the slider 39 rides on the shoulders 40 of the fastener elements, the usual clamping jaws of the fastener elements being eliminated. The loop threads 21 which surrounded the rod 20 will during the molding operation, be embedded in the body of the fastener elements as indicated at 60.

In the modified form of apparatus instead of having a single vertical acting compression member I employ opposed compression parts 41, 42 which carry the impressions 43, 44 respectively, for forming the desired shape of fastener element. The male part 42 carries the whole of the core element 45 so that the compression members can separate readily with the fastener elements 32 sticking to the compression member 42. The mold parts 46, 47 abut together above the compression members which move in suitable guideways 48 in the mold parts. There are also properly arranged heating elements 49.

Figure 13:
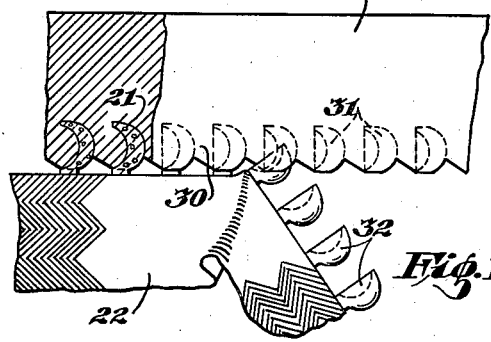
Fig. 13 shows the fastener stringer being stripped from the compression die.
Figure 14:
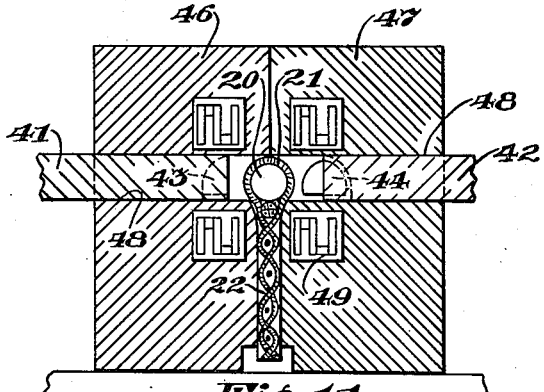
Figs. 14 and 15 are cross-sections of a die assembly in open and closed position, respectively, showing another form of apparatus for making fastener stringers according to my improved method.
Figure 15:
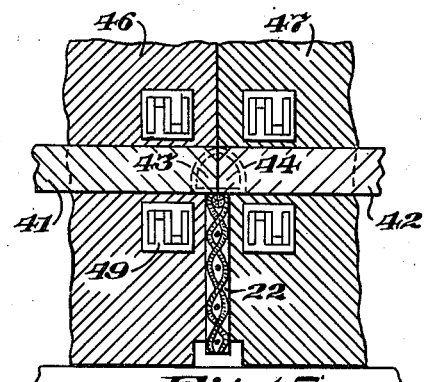
Figure 16:
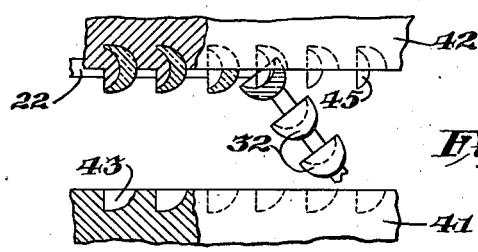
Fig. 16 shows a horizontal section of the compression die parts in open position. It also indicates how the fastener stringer may be stripped from the male die member.

In operation assuming that the tape and moldable material combination have been prepared, the same is placed in the mold chamber. The mold parts are then closed together and finally the compression member is forced into position to mold the material under substantial pressure, the temperature being kept to the proper degree depending upon the material employed. The time element will also vary with the different materials used and in the case of "Bakelite" or similar compounds, it will be necessary to allow time for curing. The mold assembly is then opened up and in the case of the form first described above, the finished fastener stringer will cling to the compression member 28, as shown in Fig. 13. It can then be stripped off by a progressive tearing action as illustrated. In the other form of apparatus the stringer will cling to the male compression member 42 and can be stripped off by bending the stringer as shown in Fig. 16.

Figure 17:
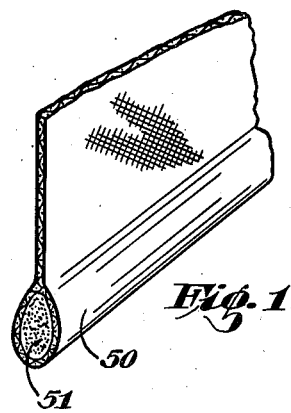
Figs. 17 and 18 show modified forms of a tape combination for use in making fasteners.
Figure 18:
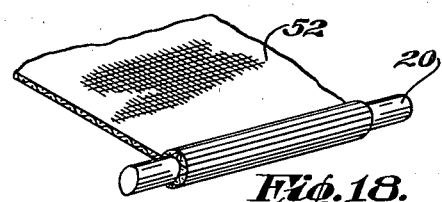

In the modification shown in Fig. 17, the tape is woven with a tubular edge 50 in which there is placed the plastic material 51 in granular or powder form. This assembly is then ready for the molding operation. In Fig. 18, I propose to use a flat tape 52 and merely fold the edge of it around the extruded rod 20. The portion which is folded around the rod may, if desired, have some of the longitudinal threads removed.

While I have shown and described in this application, certain embodiments which my invention may assume in practice, it will be understood that these embodiments are merely for the purposes of illustration and description, and that other forms may be devised within the scope of my invention as set forth in the appended claims.

What I claim as my invention is:

1. The method of making fasteners of the type having a flexible stringer tape and a plurality of attached fastener elements, which comprises surrounding moldable material in a portion of the stringer tape, and molding said material into the form of individual fastener members secured to the stringer tape at spaced intervals, at least part of the portion of the tape surrounding the moldable material being imbedded in the elements during the molding operation.

2. The method of making fasteners of the type having a fabric tape and a plurality of attached fastener elements, which comprises attaching moldable material to the tape by surrounding textile threads, and molding said material while in contact with said threads in the form of individual fastener elements at spaced intervals on the tape, a part of said material being inside said threads and a part thereof being outside said threads in the molded elements.

3. The method of making fasteners of the type having a flexible stringer tape and a plurality of attached fastener elements which comprises preparing a stringer tape having a mass of moldable material enclosed in an edge portion thereof, and then molding said material into the form of individual fastener elements secured to the stringer tape at spaced intervals, at least part of the tape edge portion which encloses said moldable material being imbedded into the elements during the molding operation, and a part of the molded material in said molded elements being surrounded by said imbedded tape edge portion.

4. The method of making fasteners of the type having a flexible tape and a plurality of attached fastener elements, which comprises first making a tape with a uniformly distributed mass of moldable material running lengthwise of the tape and surrounded by certain of the threads of the tape, and putting the combined tape and moldable material in a mold and molding the moldable material into the form of individual fastener elements secured to the stringer at spaced intervals.

5. The method defined in claim 4 wherein the mass of moldable material consists of a rod of moldable plastic material.

6. The method defined in claim 4 wherein said moldable material consists of a plastic composition in powder form and capable of being molded by heat and pressure into a rigid state.

7. The method defined in claim 4 wherein the moldable material consists of a polymerizable compound.

8. The method defined in claim 4 wherein the threads employed for holding the moldable material on the tape are rayon threads.

9. The method defined in claim 4 in which there is included the subsequent steps of flexing the stringer after the molding operation to break up any rigid connection between the individual elements.

10. The method of making fasteners of the type having a flexible tape and a plurality of attached fastener elements, which comprises preparing a tape with a tubular portion along one edge enclosing a mass of moldable material uniformly distributed lengthwise of the tape, placing such structure in a mold having impressions of the form desired to shape the fastener elements, and molding the tubular portion of such structure by heat and pressure into the form of individual fastener elements secured to the tape at spaced intervals.

11. The method of making fasteners of the type having a flexible tape and a plurality of attached fastener elements, which comprises extruding a rod of plastic material, temporarily attaching said rod to a tape by threads extending around the rod, and molding the rod in contact with the tape into the form of separable fastener elements secured to the tape at spaced intervals.

12. The method of making fasteners of the type having a flexible tape and a plurality of fastener elements which comprises weaving a structure in which at least a part of the cross-threads of the tape extend around a mass of moldable material woven therein, and molding the moldable material into the form of separate fastener elements secured to the tape at spaced intervals.

EBERHARD H. DAU.